United States Patent
Chung et al.

(10) Patent No.: US 9,188,828 B1
(45) Date of Patent: Nov. 17, 2015

(54) CONTROL CIRCUIT AND METHOD FOR MAINTAINING LIGHT TRANSMITTANCE OF ELECTROCHROMIC DEVICE

(71) Applicant: TINTABLE SMART MATERIAL CO., LTD., Tainan (TW)

(72) Inventors: Yi-Wen Chung, Tainan (TW); Chih-Ching Lin, Tainan (TW)

(73) Assignee: Tintable Kibing Co., Ltd., Tainan (TW)

( * ) Notice: Subject to any disclaimer, the term of this patent is extended or adjusted under 35 U.S.C. 154(b) by 0 days.

(21) Appl. No.: 14/300,361

(22) Filed: Jun. 10, 2014

(51) Int. Cl.
*G02F 1/15* (2006.01)
*G02F 1/163* (2006.01)
*G02F 1/155* (2006.01)

(52) U.S. Cl.
CPC .............. *G02F 1/163* (2013.01); *G02F 1/155* (2013.01)

(58) Field of Classification Search
CPC .................................. G02F 1/155; G02F 1/15
USPC .................................................. 359/265, 275
See application file for complete search history.

(56) References Cited

U.S. PATENT DOCUMENTS 6,614,577 B1 * 9/2003 Yu et al. ........................ 359/265

\* cited by examiner

*Primary Examiner* — James Jones
(74) *Attorney, Agent, or Firm* — Rosenberg, Klein & Lee

(57) ABSTRACT

A control circuit and a method for maintaining light transmittance of an electrochromic device are revealed. An input power source is turned off once a current input into an electrochromic device is decreased to a preset value. Then a voltage between two electrodes of the electrochromic device is detected. When the voltage between two electrodes of the electrochromic device is dropped to a preset value, the input power source is restored. According to the above steps, the coloration of the electrochromic device is maintained within a preset range. Thus light transmittance of the electrochromic device is kept at a certain range.

16 Claims, 8 Drawing Sheets

CONTROL CIRCUIT AND METHOD FOR MAINTAINING LIGHT TRANSMITTANCE OF ELECTROCHROMIC DEVICE

BACKGROUND OF THE INVENTION

1. Fields of the Invention

The present invention relates to a control circuit and a method, especially to a control circuit and a method for maintaining light transmittance of an electrochromic device.

2. Descriptions of Related Art

By applying an external voltage, materials have the possibility to change their color reversibly. The materials are called electrochromic materials. Electrochromic materials have the property of color changing due to electrochemical redox reactions. They are transformed in a different charged state to obtain a different color. Thus the optical properties (color or transmittance) of the electrochromic device can be adjusted by the voltage applied. After being driven by a lower voltage, the electrochromic device is switched to a colored state. When the external voltage is off, ions are diffused slowly away from the active electrochromic layer. Thus the electrochromic device is switched to a bleached state. By applying positive and negative potential alternately, electrochemical reactions occur in the electrochromic device. The color is changed between the colored state and the bleached state. The efficiency of coloration and bleaching of the electrochromic device depends on the ion movement in the electrochromic layer.

In response to the external voltage applied, the electrochromic materials change light transmittance properties. The electrochromic materials also have memory effect and reversibility of electrochromism. Thus the incidence of light or other electromagnetic radiation with different wavelengths can be controlled and adjusted. Therefore the electrochromic materials can block some wavelengths of light, control the amount of light transmission and save energy used. The electrochromic materials have attracted considerable attention recently.

However, the longer the voltage is applied, the more ions are transferred and the darker the electrochromic material is. The light transmittance is reduced. Thus the electrochromic materials are not suitable for special glass on vehicles that requires good transmittance. There is room for improvement.

SUMMARY OF THE INVENTION

Therefore it is a primary object of the present invention to provide a control circuit and a method for maintaining light transmittance of an electrochromic device in which the electrochromic device is able to have both light transmittance and light shielding properties under control of power supply modes.

It is another object of the present invention to provide a control circuit and a method for maintaining light transmittance of an electrochromic device by which the electrochromic device is switched to colored state rapidly and the electrochromic response time is shortened.

It is a further object of the present invention to provide a control circuit and a method for maintaining light transmittance of an electrochromic device in which a coloring power source provided by an input power source is a direct current (DC) pulse voltage source. By regular and repetitive power supply of the DC pulse voltage source within the electrochromic response time (coloration time), the coloring efficiency of the electrochromic device is improved In order to achieve the above objects, a control circuit for maintaining light transmittance of an electrochromic device of the present invention includes a color switch electrically connected to an electrode of an input power source. The color switch is electrically connected to a current detecting unit while the current detecting unit is electrically connected to an electrode of at least one electrochromic device. A voltage detecting unit is electrically connected to two electrodes of the electrochromic device.

In accordance with the above control circuit, the input power source provides the electrochromic device a coloring power source to make the electrochromic device start coloration after the color switch being turned on. At the same time, the current detecting unit detects that whether a value of coloring current of the coloring power source for the electrochromic device is decreased to a preset value. After the value of the coloring current reaching the preset value, the color switch is turned off and no more coloring power source is provided to the electrochromic device. Next the color switch is turned on again after the voltage detecting unit detecting that a voltage between the two electrodes of the electrochromic device is dropped to a preset value. The input power source provides the electrochromic device the coloring power source again. Thus the electrochromic device in the colored state is maintained within a preset color-depth range. The color of the electrochromic device in the colored state will not become deeper and the light transmittance will not be affected.

In the above control circuit, the coloring power source provided by the input power source is a direct current voltage source.

In the control circuit mentioned above, the other electrode of the input power source is electrically connected to a bleach switch while the bleach switch is electrically connected to the other electrode of the electrochromic device. Thereby once the bleach switch being turned on, the input power source inputs a bleaching power source into the electrochromic device so as to make the electrochromic device change to the bleached state rapidly.

The bleaching power source can be a reverse DC (direct current) voltage source.

In order to increase the bleaching efficiency, the bleaching power source is a reverse DC pulse voltage source.

A method for maintaining light transmittance of electrochromic devices includes a plurality of steps. The input power source is cut off when the current of the coloring power source for the electrochromic device is dropped to a preset value. At the moment, the voltage between two electrodes of the electrochromic device is detected. When the voltage between two electrodes of the electrochromic device is decreased into a preset value, the coloring power source provided by the input power source is restored. Thereby the color of the electrochromic device in the colored state is controlled within a preset range and the light transmittance of the electrochromic device is maintained effectively.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
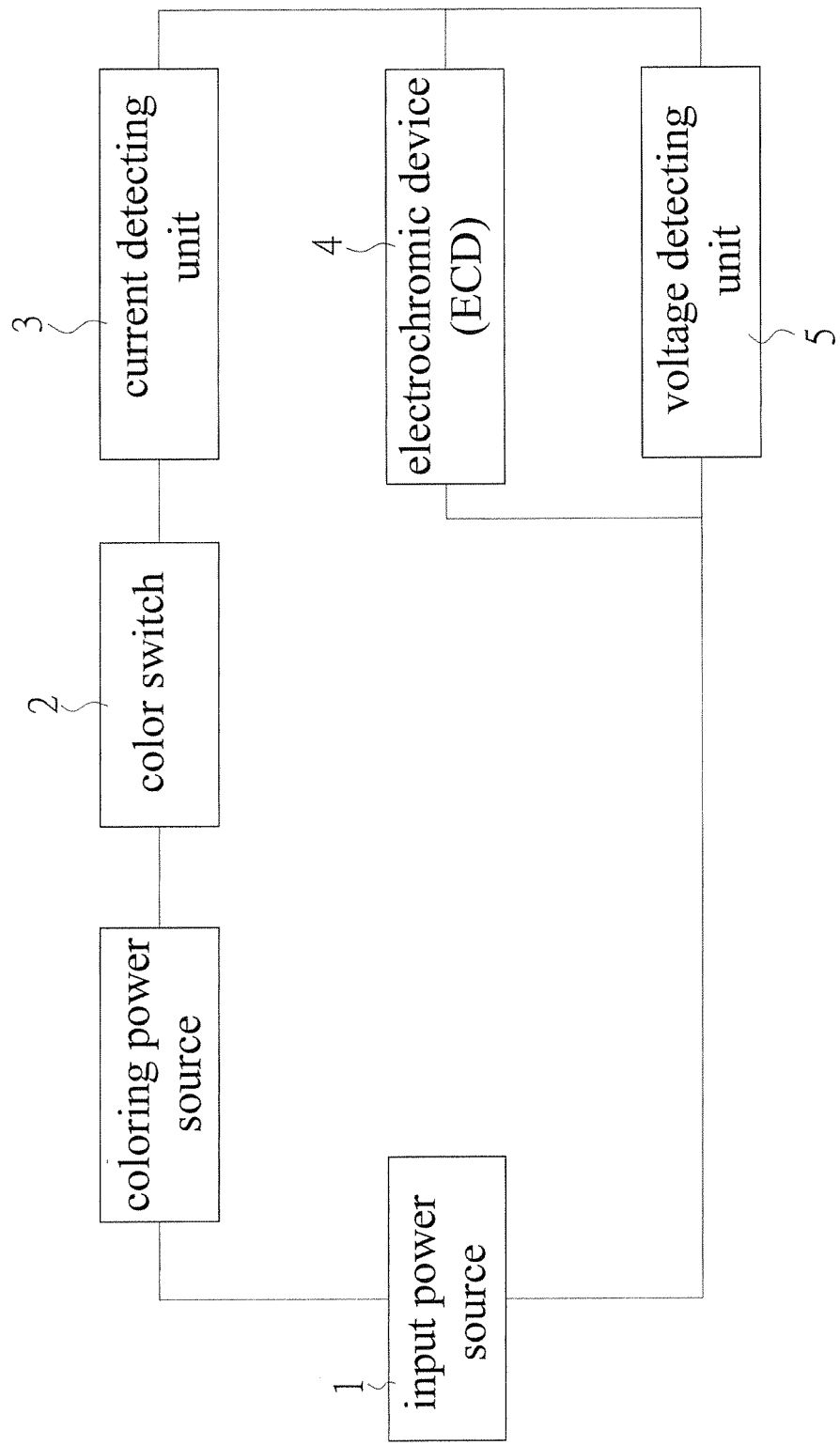
FIG. 1 is a block diagram showing structure of an embodiment of a control circuit for maintaining light transmittance of an electrochromic device according to the present invention.

Refer to FIG. 1, a control circuit for maintaining light transmittance of an electrochromic device (ECD) includes an input power source 1, a color switch 2, at least one current detecting unit 3, at least one electrochromic device (ECD) 4 and at least one voltage detecting unit 5. An electrode of the input power source 1 is electrically connected to the color switch 2 while the color switch 2 is electrically connected to the current detecting unit 3. The current detecting unit 3 is electrically connected to one electrode of the electrochromic device 4 and the voltage detecting unit 5 is electrically connected to and arranged between two electrodes of the electrochromic device 4.

After the color switch 2 being turned on, the input power source 1 provides the electrochromic device 4 a coloring power source. Thus the electrochromic device 4 starts coloration. When the current detecting unit 3 detects that the value of coloring current of the coloring power source for the electrochromic device 4 is decreased to a preset value, the color switch 2 is turned off. Thus there is an open circuit between the input power source 1 and the electrochromic device 4. No more coloring power source is provided to the electrochromic device 4. Now the electrochromic device 4 is switched from the colored state to the bleached state. The color switch 2 is turned on again after the voltage detecting unit 5 detecting that the voltage between the two electrodes of the electrochromic device 4 is decreased into a preset value. Thus the circuit between the input power source 1 and the electrochromic device 4 is conducting. The input power source 1 supplies power to the electrochromic device 4 once again. The electrochromic device 4 is returned to the colored state. After multiple cycles, the electrochromic device 4 in the colored state is maintained within a preset color-depth range. The color of the device will not become deeper and the light transmittance will not be reduced.

Figure 2:
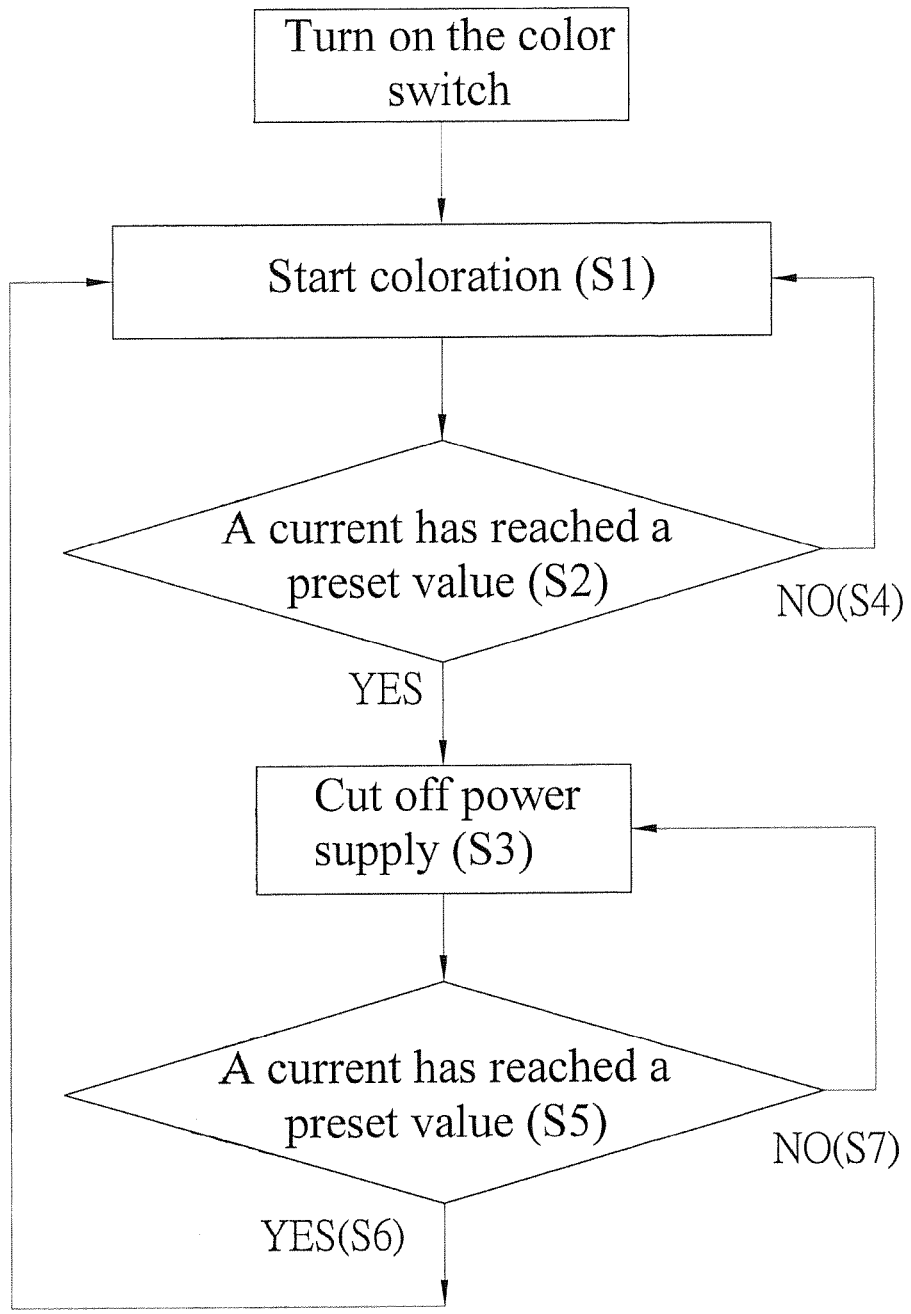
FIG. 2 is a flow chart showing steps of an embodiment of a method for maintaining light transmittance of an electrochromic device according to the present invention.

Refer to FIG. 2, a method for maintaining light transmittance of an electrochromic device includes following steps:

(S1) initiating a coloring process by providing a electrochromic device 4 a coloring power source;

(S2) detecting whether a current of the coloring power source provided to the electrochromic device 4 is dropped to a preset value;

(S3) cutting off the input power and no longer providing a coloring power source to the electrochromic device 4 once the current of the coloring power source is decreased to the preset value;

(S4) returning to the step S2 and continuing detecting the current of the coloring power source if the current of the coloring power source is not decreased to the preset value;

(S5) detecting a voltage between two electrodes of the electrochromic device 4 under a condition that no coloring power source is provided to the electrochromic device 4;

(S6) returning to the step S1 when the voltage between two electrodes of the electrochromic device 4 is decreased into a preset voltage value; and (S7) going back to the step S3 when the voltage between two electrodes of the electrochromic device 4 is not decreased into a preset voltage value.

According to the steps mentioned above, the colored state of the electrochromic device 4 is controlled within a preset range and the light transmittance of the electrochromic device 4 is maintained effectively.

In the control method of light transmittance of electrochromic devices mentioned above, the coloring power source provided by the input power source is a direct current (DC) voltage source.

Figure 3:
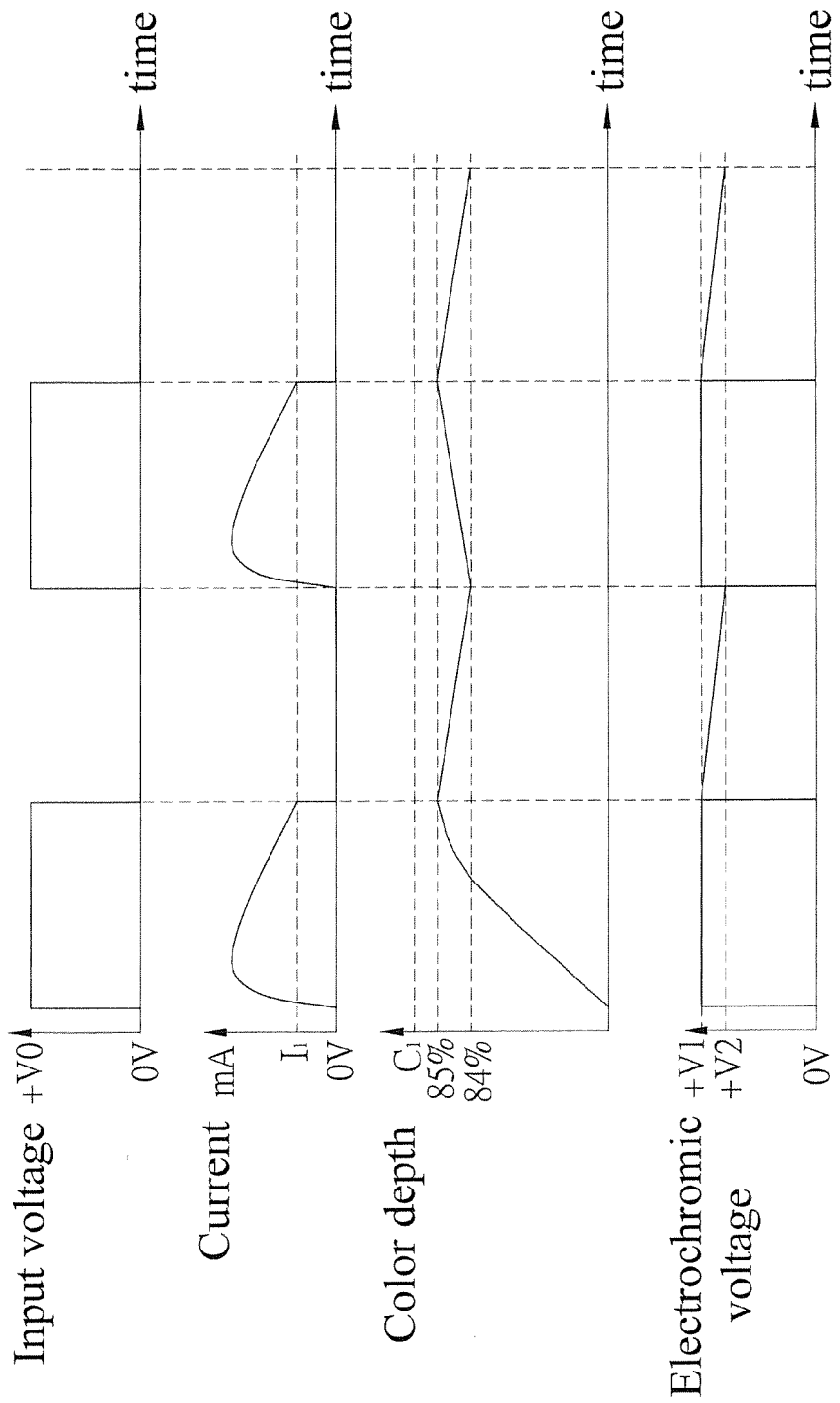
FIG. 3 shows waveforms (direct current voltage) of a control circuit for maintaining light transmittance of an electrochromic device during coloration according to the present invention.

Refer to FIG. 3, the electrochromic response ratio of the electrochromic device 4 is set between 84%-85% while the preset value of coloring current of the coloring power source is I1, and the voltage between two electrodes of the electrochromic device 4 being detected is V2. It is assumed that the coloring power source is a direct current voltage source. After the color switch 2 being turned on, the input power source 1 provides a coloring power source to the electrochromic device 4 so that the electrochromic device 4 begins coloration. When the electrochromic response ratio of the electrochromic device 4 reaches 85%, the current detecting unit 3 detects that the current value of the coloring power source is dropped to I1 and immediately turns off the color switch 2. Thus the circuit between the input power source 1 and the electrochromic device 4 is broken. At the moment, the electrochromic device 4 is switched to the bleached state. When the electrochromic response ratio of the electrochromic device 4 is decreased into 84% and the voltage detecting unit 5 detects that the voltage between two electrodes of the electrochromic device 4 is dropped to V2, the color switch 2 is activated again so as to input the coloring power source. In accordance with the repetitive steps mentioned above, the electrochromic response ratio of the electrochromic device 4 is maintained within a range of 84%~85% and the light transmittance is ensured.

Figure 4:
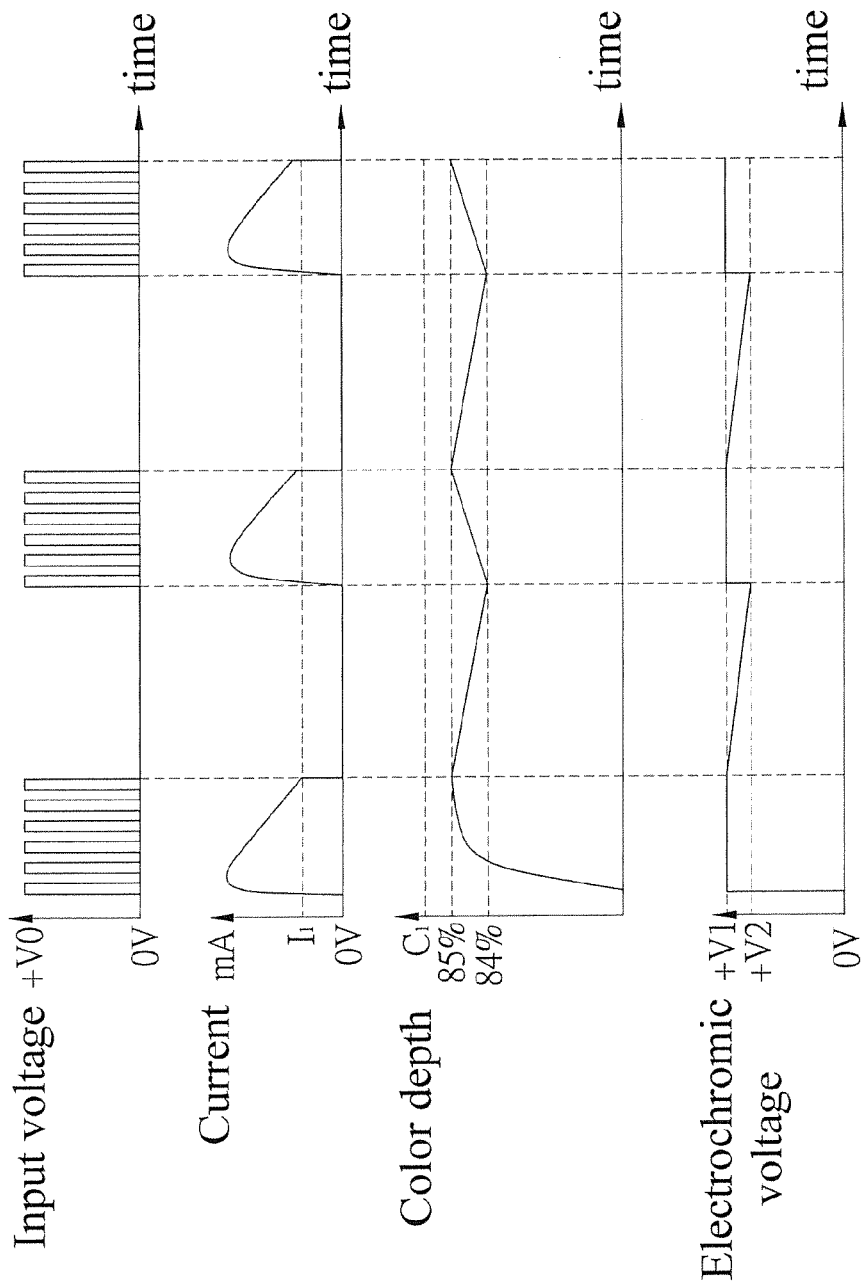
FIG. 4 shows other waveforms (direct current pulse voltage) of a control circuit for maintaining light transmittance of an electrochromic device during coloration according to the present invention.

Refer to waveforms shown in FIG. 4, the conditions of this embodiment are nearly the same as those of the embodiment in FIG. 3 except that the coloring power source is a direct current pulse voltage. By regular and repetitive power supply of the DC pulse voltage source within the electrochromic response time (coloration time), the coloring efficiency of the electrochromic device 4 is improved.

Figure 5:
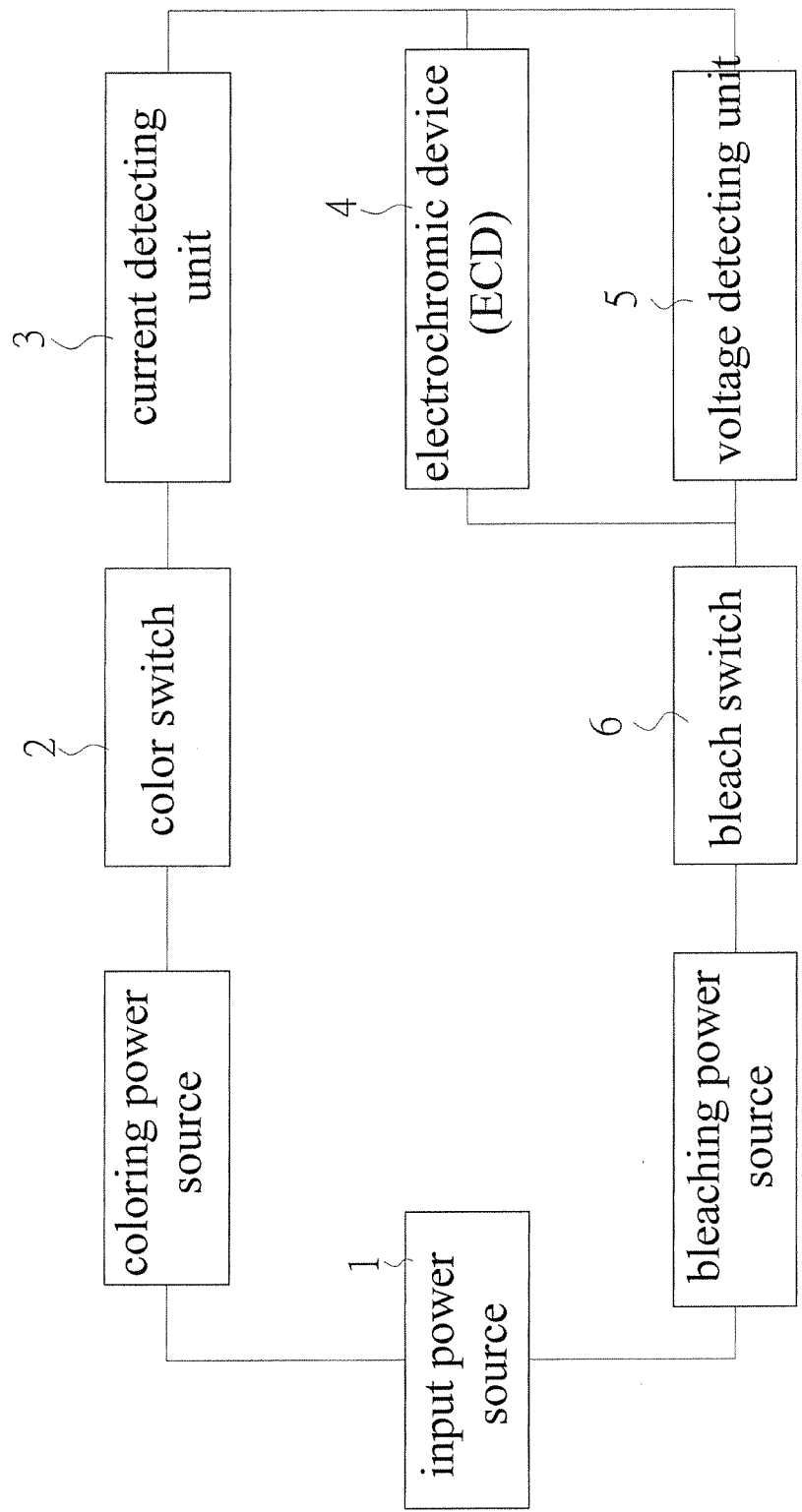
FIG. 5 is a block diagram showing structure of another embodiment of a control circuit for maintaining light transmittance of an electrochromic device according to the present invention.

Refer to FIG. 5, the other electrode of the input power source 1 is electrically connected to a bleach switch 6 while the bleach switch 6 is electrically connected to the other electrode of the electrochromic device 4. A bleaching power source can be a reverse DC (direct current) voltage source or a reverse DC pulse voltage source with better bleaching efficiency.

Figure 6:
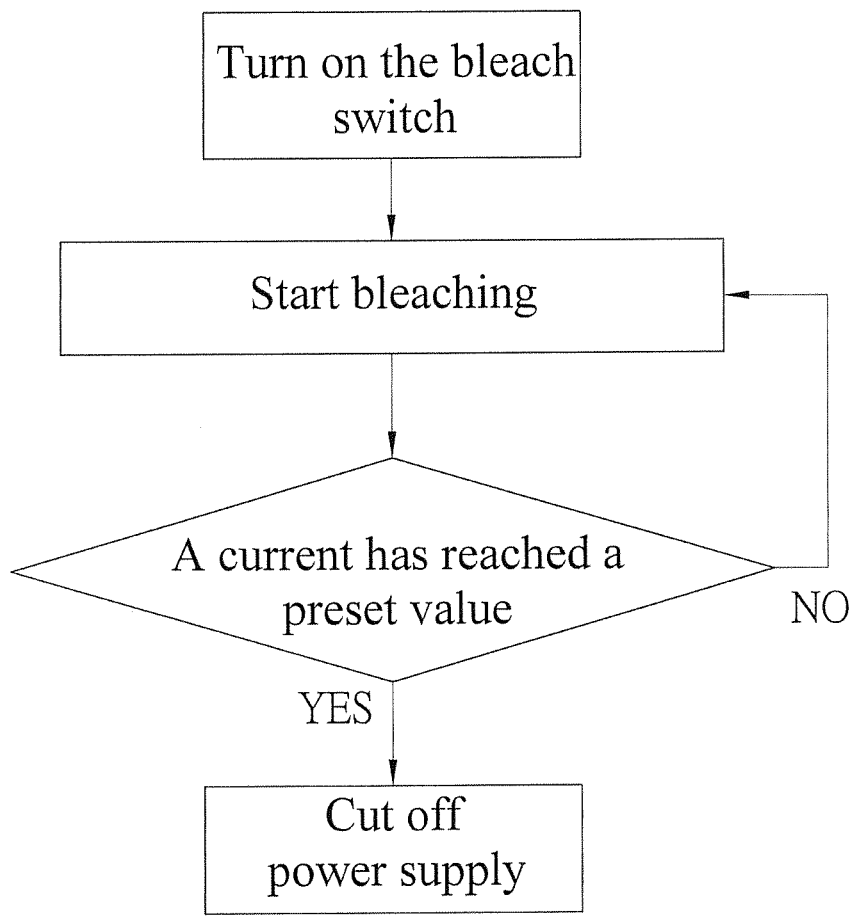
FIG. 6 is a flow chart showing bleaching steps of an embodiment of a method for maintaining light transmittance of an electrochromic device according to the present invention.
Figure 7:
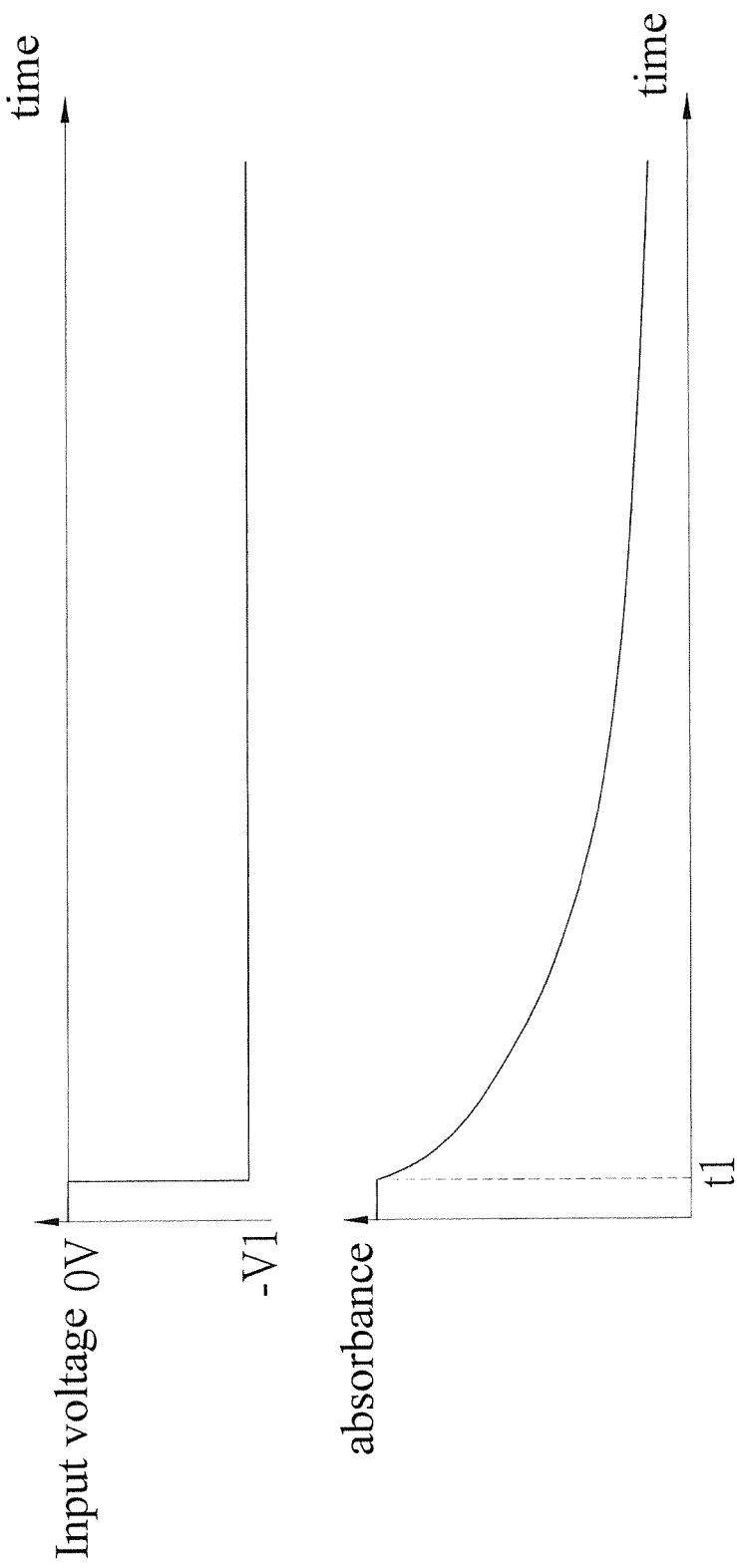
FIG. 7 shows waveforms (direct current voltage) of an embodiment of a control circuit for maintaining light transmittance of an electrochromic device during bleaching according to the present invention.
Figure 8:
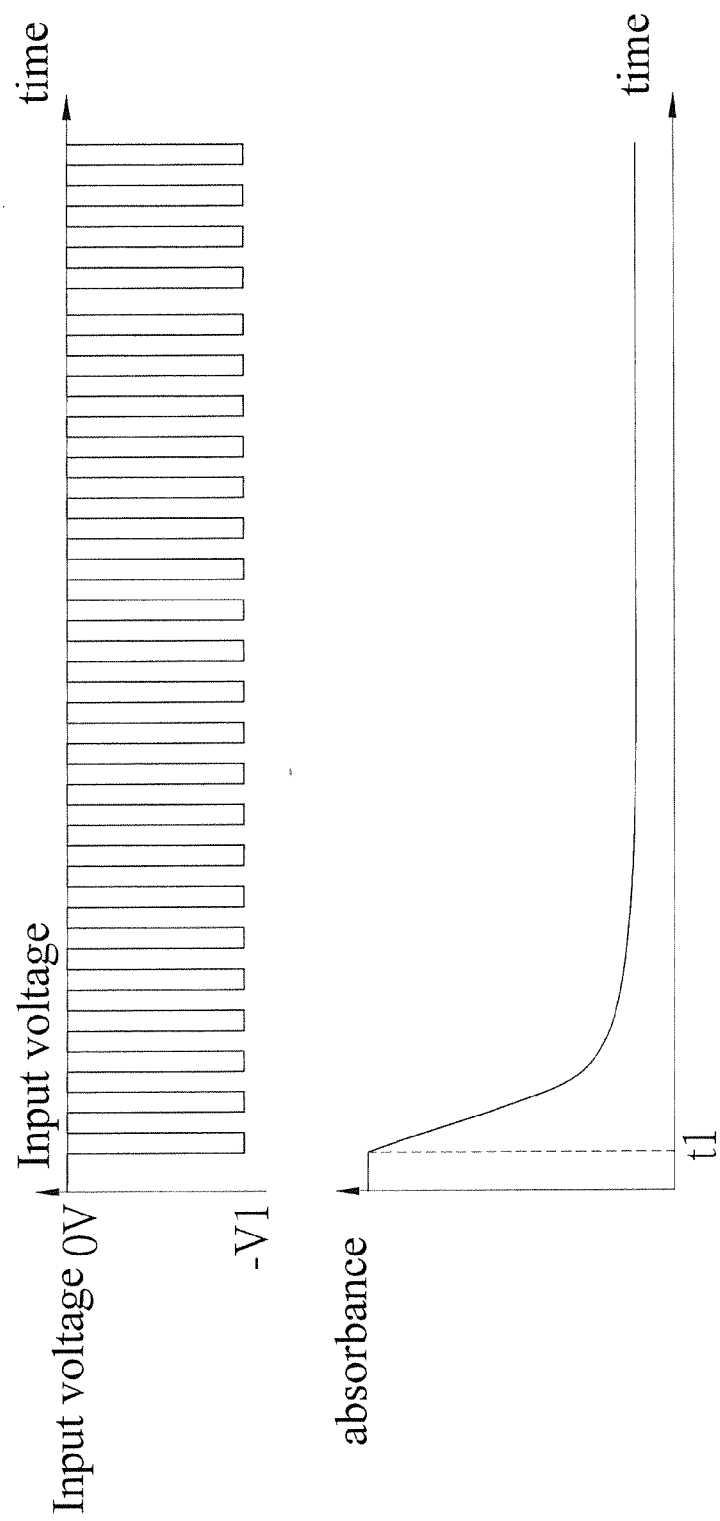
FIG. 8 shows other waveforms (direct current pulse voltage) of an embodiment of a control circuit for maintaining light transmittance of an electrochromic device during bleaching according to the present invention.

Refer to FIG. 6, FIG. 7 and FIG. 8, after the bleach switch 6 being activated, the input power source 1 inputs a reverse DC voltage or a reverse DC pulse voltage of the bleaching power source into the electrochromic device 4. Thus the electrochromic device 4 is switched to the bleached state rapidly. After the electrochromic device 4 completing the bleaching, the input power source 1 stops providing the reverse DC voltage or the reverse DC pulse voltage of the bleaching power source.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A control circuit for maintaining light transmittance of an electrochromic device comprising:
    an input power source;
    a color switch electrically connected to the input power source;
    a current detecting unit electrically connected to the color switch;
    at least one electrochromic device electrically connected to the current detecting unit, the input power source providing a current to the electrochromic device responsive to turning on of the color switch; and
    a voltage detecting unit electrically connected between two electrodes of the electrochromic device to detect a voltage across the electrochromic device,
    wherein (a) the color switch is turned off to disconnect the electrochromic device from the input power source responsive to the current detecting unit detecting the current being provided to the electrochromic device has reached a preset current value, and (b) subsequent to the color switch being turned off, the color switch is turned on responsive to the voltage detecting unit detecting the voltage across the electrochromic device has decreased to a preset voltage value.

2. The control circuit as claimed in claim 1, wherein the input power source is a direct current voltage source.

3. The control circuit as claimed in claim 2, further comprising a bleach switch, the input power source is being additionally electrically connected to the electrochromic device through the bleach switch.

4. The control circuit as claimed in claim 3, wherein the input power source provides a reverse polarity direct current voltage to the electrochromic device through the bleach switch.

5. The control circuit as claimed in claim 3, wherein the input power source provides a reverse polarity direct current pulse voltage to the electrochromic device through the bleach switch.

6. The control circuit as claimed in claim 1, wherein the input power source is a direct current pulse voltage source.

7. The control circuit as claimed in claim 6, further comprising a bleach switch, the input power source being additionally electrically connected to the electrochromic device through the bleach switch.

8. The control circuit as claimed in claim 7, wherein the input power source provides a reverse polarity direct current pulse voltage to the electrochromic device through the bleach switch.

9. The control circuit as claimed in claim 1, further comprising a bleach switch, the input power source being additionally electrically connected to the electrochromic device through the bleach switch.

10. The control circuit as claimed in claim 9, wherein the input power source provides a reverse polarity direct current voltage to the electrochromic device through the bleach switch.

11. The control circuit as claimed in claim 9, wherein the input power source provides a reverse polarity direct current pulse voltage to the electrochromic device through the bleach switch.

12. A method for maintaining light transmittance of an electrochromic device comprising the steps of:
    (a) supplying power to the electrochromic device through a turned-on color switch and an input power source;
    (b) turning off the color switch to cutoff power to the electrochromic device when detecting a current provided to the electrochromic device has reached a preset current value;
    (c) turning on the color switch to restore power to the electrochromic device when detecting a voltage across two electrodes of the electrochromic device has decreased to a preset voltage value; and
    (d) repeating steps (b) and (c) to thereby maintain a colored state and light transmittance of the electrochromic device within a preset range.

13. The method as claimed in claim 12, wherein the step of supplying power to the electrochromic device includes the step of supplying a direct current from the input voltage source.

14. The method as claimed in claim 12, wherein the step of supplying power to the electrochromic device includes the step of supplying a direct current pulse from the input voltage source.

15. The method as claimed in claim 12, wherein the step of detecting the current provided to the electrochromic device includes the step of detecting the current provided to the electrochromic device using a current detecting unit coupled between the color switch and the electrochromic device.

16. The method as claimed in claim 12, wherein the step of detecting the voltage across the two electrodes of the electrochromic device includes the step of detecting the voltage across the two electrodes of the electrochromic device using a voltage detecting unit coupled between the two electrodes of the electrochromic device.

* * * * *